US011320331B2

(12) United States Patent
Rousseau et al.

(10) Patent No.: US 11,320,331 B2
(45) Date of Patent: May 3, 2022

(54) EQUIPMENT FOR TESTING A CALIBRATED GAS LEAK ON A TYRE VALVE, PLUG FOR SUCH EQUIPMENT, AND ASSOCIATED METHOD FOR CONTROLLING LEAK DETECTION

(71) Applicant: ATEQ, Les Clayes sous Bois (FR)

(72) Inventors: Bruno Rousseau, Paris (FR); Hugo Streicher, Plaisir (FR)

(73) Assignee: ATEQ, Les Clayes sous Bois (FR)

( * ) Notice: Subject to any disclaimer, the term of this patent is extended or adjusted under 35 U.S.C. 154(b) by 101 days.

(21) Appl. No.: 16/204,799

(22) Filed: Nov. 29, 2018

(65) Prior Publication Data
US 2019/0162621 A1 May 30, 2019

(30) Foreign Application Priority Data
Nov. 30, 2017 (FR) ...................................... 1761485

(51) Int. Cl.
*G01L 27/00* (2006.01)
*B60C 23/04* (2006.01)
*B60C 29/06* (2006.01)

(52) U.S. Cl.
CPC ............ *G01L 27/005* (2013.01); *B60C 23/04* (2013.01); *B60C 23/0477* (2013.01);
(Continued)

(58) Field of Classification Search
CPC ... B60C 23/0474; B60C 25/18; B60C 25/185; B60C 29/068; G01M 3/3218; G01M 3/007
See application file for complete search history.

(56) References Cited

U.S. PATENT DOCUMENTS 1,724,063 A * 8/1929 Anderson ............. B60C 29/068
                                                            137/225
4,151,863 A * 5/1979 Stevens ............... B60C 23/0496
                                                            137/798
(Continued)

FOREIGN PATENT DOCUMENTS

| CN | 203567487 U | 4/2014 |
|---|---|---|
| EP | 524057 A1 | 1/1993 |
| EP | 2562012 A1 | 2/2013 |

OTHER PUBLICATIONS

Grygier et al., "Tire Pressure Monitoring System Tests for Medium and Heavy Trucks and Buses", Jun. 2010, National Highway Traffic Safety Administration, Vehicle Research and Test Center, DOT HS 811 314. (Year: 2010).*

*Primary Examiner* — Tran M. Tran
(74) *Attorney, Agent, or Firm* — Young Basile Hanlon & MacFarlane, P.C.

(57) ABSTRACT

The invention relates to equipment, devices and methods for testing a calibrated leak or passage of pressurized gas from a tire. In one example, a test plug including a calibrated cross section orifice and a predetermined gas flow rate is connected to a tire. The test plug applies a pressure opening the tire valve member to release gas from the tire through the test plug. In one example, a TPMS sensor and a TPMS measurement tool are used to measure the decrease of air pressure in the tire through the test plug and determine if the TPMS sensor is operating properly. In one example, a plurality of test plugs with different gas flow rates are provided. A method for testing the calibrated leak using the test plug is further disclosed.

20 Claims, 3 Drawing Sheets

(52) U.S. Cl.
CPC ...... *B60C 23/0479* (2013.01); *B60C 23/0481* (2013.01); *B60C 29/06* (2013.01); *B60C 29/066* (2013.01)

(56) References Cited

U.S. PATENT DOCUMENTS

| | | | | |
|---|---|---|---|---|
| 4,512,278 A * | 4/1985 | Winther | B60C 23/0496 |
| | | | 116/272 |
| 4,569,363 A * | 2/1986 | Kleeman | B60C 29/00 |
| | | | 137/230 |
| 4,681,148 A * | 7/1987 | Decker, Jr | B60C 23/0496 |
| | | | 137/230 |
| 4,895,199 A * | 1/1990 | Magnuson | B60C 23/003 |
| | | | 137/102 |
| 5,058,418 A * | 10/1991 | Knotts | B60C 29/06 |
| | | | 73/31.01 |
| 5,295,504 A * | 3/1994 | Riquier | B60C 23/0496 |
| | | | 137/230 |
| 5,665,908 A * | 9/1997 | Burkey | B60C 23/0496 |
| | | | 137/228 |
| 5,850,036 A * | 12/1998 | Giromini | G01M 3/202 |
| | | | 73/40 |
| 6,401,743 B1 * | 6/2002 | Naedler | B60C 23/003 |
| | | | 137/224 |
| 6,408,913 B1 * | 6/2002 | Caretta | B60C 5/22 |
| | | | 137/227 |
| 6,427,714 B2 * | 8/2002 | Freigang | B60C 23/003 |
| | | | 137/225 |
| 6,733,875 B1 | 5/2004 | Takano et al. | |
| 6,799,455 B1 * | 10/2004 | Neefeldt | B60C 23/0496 |
| | | | 73/146 |
| 7,667,583 B2 * | 2/2010 | Petrucelli | B60C 23/0496 |
| | | | 340/442 |
| 7,882,731 B1 * | 2/2011 | Franks | G01L 17/00 |
| | | | 73/146 |
| 8,146,413 B1 * | 4/2012 | Grace | B60C 23/0496 |
| | | | 73/146.8 |
| 8,256,447 B2 * | 9/2012 | Badstue | B60C 29/06 |
| | | | 137/226 |
| 8,336,667 B2 * | 12/2012 | Tzarum | B60R 25/096 |
| | | | 180/287 |
| 8,387,453 B2 * | 3/2013 | Petrucelli | G01L 17/00 |
| | | | 73/146.8 |
| 8,720,467 B2 * | 5/2014 | Ferlin | B60C 29/06 |
| | | | 137/15.19 |
| 9,050,862 B2 * | 6/2015 | Mouchet | B60C 23/0479 |
| 9,133,970 B2 * | 9/2015 | Wang | F16K 3/267 |
| 9,168,794 B2 * | 10/2015 | Peinelt | G01M 17/02 |
| 9,587,753 B2 * | 3/2017 | Wang | B60C 25/18 |
| 9,689,779 B2 * | 6/2017 | Careme | G01M 3/04 |
| 9,701,165 B2 * | 7/2017 | Kochie | B60C 23/0447 |
| 9,772,258 B2 * | 9/2017 | Merino Lopez | G01L 17/00 |
| 9,802,449 B1 * | 10/2017 | Lewellyn | B60C 29/066 |
| 10,073,001 B2 * | 9/2018 | Luedolph | G01M 3/20 |
| 10,315,473 B2 * | 6/2019 | Weflen | B60C 23/10 |
| 10,442,257 B2 * | 10/2019 | Abdossalami | B60C 23/06 |
| 11,052,621 B2 * | 7/2021 | Chou | F04B 23/02 |
| 2005/0000568 A1 | 1/2005 | Nikolayev | F16L 37/23 |
| | | | 137/231 |
| 2007/0193348 A1 * | 8/2007 | Rutherford | B60C 23/0498 |
| | | | 73/146.8 |
| 2008/0011057 A1 * | 1/2008 | Spaolonzi | G01M 3/38 |
| | | | 73/40 |
| 2008/0258893 A1 | 10/2008 | Huang et al. | |
| 2010/0101316 A1 | 4/2010 | Lin | |
| 2015/0174972 A1 * | 6/2015 | Zhou | B60C 23/0467 |
| | | | 340/447 |
| 2016/0023523 A1 * | 1/2016 | Palacios | B60C 23/0496 |
| | | | 73/146.8 |
| 2016/0167456 A1 * | 6/2016 | Mozingo | F16K 15/063 |
| | | | 137/12 |
| 2019/0047335 A1 * | 2/2019 | Balistreri | F16K 15/06 |
| 2020/0070600 A1 * | 3/2020 | Robert | B60C 23/0494 |
| 2021/0041325 A1 * | 2/2021 | Mannella | G01M 3/224 |

* cited by examiner

EQUIPMENT FOR TESTING A CALIBRATED GAS LEAK ON A TYRE VALVE, PLUG FOR SUCH EQUIPMENT, AND ASSOCIATED METHOD FOR CONTROLLING LEAK DETECTION

CROSS-REFERENCE TO RELATED APPLICATIONS

This invention claims priority benefit to French Patent Application No. 1761485 filed Nov. 30, 2017 the entire contents of which is incorporated by reference.

FIELD OF THE INVENTION

The invention relates to a device for controlling and calibrating sensors for detecting a gas leak in a tyre, typically but not exclusively a tyre inflated with gas for a transportation vehicle.

The invention relates more particularly to the fact that a controlled leak, used to calibrate a pressure sensor of the tyre, for example of the Tire Pressure Management (or monitoring) System (TPMS) type, is caused by the installation of a test plug that is screwed onto the valve of the tyre, said plug having an element limiting the gas leak according to a predetermined flow rate.

The plug calibrated according to the invention is designed to create a leak of the inflation gas of the tyre and thus a decrease in pressure in the tyre. This decrease in pressure is typically measured by a TPMS sensor and the measurement values are transmitted wirelessly via radio frequency signal to a TPMS tool. The goal is to measure that the sensor functions and optionally that the system onboard the vehicle indeed detects a leak, even weak or small, of the gas of a tyre.

The invention also relates to a testing and calibration method, and a corresponding device.

BACKGROUND

Today, vehicles have numerous pieces of equipment improving the safety of passengers. A particularly sensitive element for safety is the tyres, which must be in a good state in order to adhere to the road and allow good control of the trajectory. The failure of a tyre is generally due to a leak of the pressurized gas contained inside. In order to prevent an accident, it is desirable to regularly verify the state of each tyre of the vehicle, in terms of both their wear and their internal gas pressure.

Equipment for monitoring the pressure of the tyres through TPMS is required in certain countries, such as the USA. When the pressure of the tyre (or tire) decreases abnormally and the tyre is deformed, which can cause a failure of the tire, a sound and/or light alert appears on the dashboard of the vehicle in order to warn the driver. One way to detect a leak in a tyre involves providing it with a TPMS sensor directly installed in the wheel, preferably at the valve stem of the tyre. These sensors measure various parameters such as: the pressure of the internal gas, the temperature of the tyres, the speed of rotation of the wheels. The sensors themselves comprise a specific TPMS sensor identification code (ID) and are capable of receiving electronic signals and sending electronic signals wirelessly to an onboard vehicle electronic control unit (ECU). If a wheel sensor transmits a gas pressure of the tyres or another condition in a tyre that is above or below a predetermined level, the ECU emits alert signals to the dashboard inside the passenger compartment in order to warn the driver.

In vehicle manufacturing lines and automobile garages, the operators mount the TPMS sensors and are then tasked with testing their operations. A test involves in particular causing a leak in the tyre and analysing the signals emitted by the corresponding TPMS sensor. The analysis of the signals is carried out by an appropriate tool hereinafter called "TPMS tool."

It is known to voluntarily create an orifice in the rubber of a tyre with a drill and a drill bit having a predetermined diameter. This orifice causes a leak of gas contained in the tyre. The pressure of the gas is constantly measured by the TPMS sensor and transmitted to the TPMS tool which analyses the change in the pressure and displays a piece of information representative of the decrease in the pressure. This method does not allow to guarantee a calibrated diameter of the orifice, thus the air flow rate of the leak is not sufficiently controlled and cannot therefore be quantified. Piercing through a rim is possible but complicated because of the thickness of the rim, and the plugging of the orifice is complicated and takes time.

The applicant offers for sale devices for measuring calibrated gas leaks. These devices involve introducing a certain quantity of tracer gas into a tyre and, once an orifice is created, detecting the presence of the tracer gas around the tyre. These devices have a screen, a keyboard and a probe that the operator moves at the surface of the tyre, the probe really "sniffs" the ambient air and detects the presence of the tracer gas, the device then displays, on its screen, the quantity of tracer gas that is detected. The indications provided by the TPMS sensor that characterise the gas leak seen from inside the tyre, are compared to the information provided by this device on the leak detected outside of the tyre. When the indications are almost identical, the TPMS sensor is functioning perfectly.

In this process, there is a need to control the flow rate of gas that escapes the tyre, which implies calibrating the device causing the leak. Moreover, this device causing the leak must be removed after the measurement while leaving the tyre in working order, it is therefore recommended to propose a device which can be easily removed and which allows to easily leave the tyre in an operational state.

In a field other than that of testing sensors detecting leaks of a tyre, it is known to create leaks called "rubis." The device has a cylinder, the inner orifice of which corresponds to a very low calibrated flow rate. The difficulty is in mastering the very low flow rate allowed by the orifice. The smaller the orifice, the more difficult it is to create: the laser generally produces a cross-section in the shape of a potato that is not suitable for narrow orifice diameters. In order to produce low flow rates, it is planned to use a sintered membrane consisting of a porous element letting pressurised gas escape. By compressing the porous element during the shaping of the membrane, the resistance to the passage of the gas is increased and the flow rate is thus reduced to the desired value.

The present invention describes an improvement involving having a device simulating a leak which produces a calibrated flow rate of gas and which can easily be removed while leaving the tyre in an operational state.

SUMMARY

The goal of the invention is to overcome the disadvantages disclosed above, as well as others that will appear in the rest of this document.

For this purpose, an object of the invention is equipment for testing a calibrated leak of pressurized gas out of a tyre (or tire) of the type comprising on the one hand a means, through a device and process, for causing a gas leak out of said tyre, and on the other hand a means, through a device and process, for detecting said gas leak. Said means for causing a gas leak consists of a plug having a calibrated leak intended to be fastened onto the valve of said tyre, and said plug having a calibrated leak comprises a means for applying a pressure force on the valve member of the valve and an orifice having a calibrated cross-section. In this way, it is easy for an operator to place a test plug on the valve of the inflated tyre and to control, using a means for detecting a gas leak, the conditions in which the decrease in the pressure corresponding to the leak thus caused occurs.

This mounting can be used for numerous types of uses, in particular the testing of pressure sensors, for example of the TPMS type, as will be discussed below.

According to another embodiment, said means for detecting said gas leak comprises a device for detecting and/or measuring the change in the pressure of the gas in the tyre escaping through the orifice.

According to another embodiment, already mentioned, said means for detecting said gas leak uses a TPMS sensor mounted in said tyre, said TPMS sensor communicating via wireless radio wave frequency with the detection and measurement device.

Advantageously, the detection and measurement device comprises means, through a device and process, for storing and returning the test results, said means being adjustable according to the calibration of the plug having a calibrated leak used.

According to another embodiment, the inventive device or equipment comprises a set of a plurality of plugs having a calibrated leak, the detection and measurement device also comprising selectable detection and measurement means adapted to each of said plugs.

According to another embodiment, the inventive device or equipment also comprises means, through a device and process, for periodic testing of the plug having a calibrated leak and for determining and taking into account the variations in the leak values over time.

According to another embodiment, the plug is a consumable or disposable element intended to be thrown away after a certain number of uses. This scenario or example corresponds in particular to the case of plugs having a sintered membrane, which undergo rapid wear.

According to another aspect, the invention also covers the plug itself, taken alone, as intended to be fastened onto a valve of a tyre inflated with a gas, this plug comprising as already mentioned a means, through a device and process, for applying a pressure on the valve member of the valve and an orifice having a calibrated cross-section letting a predetermined flow rate of gas escape from the pressurized interior of the tyre through the plug device.

Advantageously, the plug is naturally intended in particular to function with the inventive device or equipment as described above.

Advantageously, the exemplary plug comprises a cylindrical body comprising said pressure means (or device) and a support, also cylindrical, open at an end into which said body is inserted freely by sliding, the bottom and the sides of the support forming, with the face of the body oriented towards the bottom, a chamber having a cylindrical shape, and the support is screwed onto the valve of the tyre up to a position in which the pressure means (or device) of the body exerts a pressure on the valve member in order to open it.

Preferably, the sealing between the body and the support is achieved by an O-ring.

According to a first embodiment, said orifice is a pierced orifice formed in such a way as to allow substantially a calibrated laminar flow.

According to a second embodiment, the orifice is calibrated by insertion of a sintered membrane.

According to an advantageous alternate embodiment, the plug comprises a removable seal intended to be removed before the installation of the plug on the tyre. This seal aims to protect the integrity of the calibrated orifice during the period of storage of the plug before use.

Finally, an alternate aspect of the invention includes a method for using the measurement equipment or devices described above in order to calibrate a predetermined flow rate of gas escaping from a tyre, by using a plug as described above.

Advantageously, the method is used to test the operational state of a TPMS sensor and/or of a detection and measurement device using signals emitted by a TPMS sensor.

According to one of the features of the invention, in the context of implementation of the method of the invention, each plug is designed to provide a predetermined leak rate at a certain pressure according to the tyre test to be carried out.

DESCRIPTION OF THE DRAWINGS

Other features and advantages of the invention will be clear from the following description, given as a non-limiting example, and made in reference to the appended drawings, in which.

DETAILED DESCRIPTION OF THE INVENTION

The identical elements in the various drawings have the same references.

Figure 1:
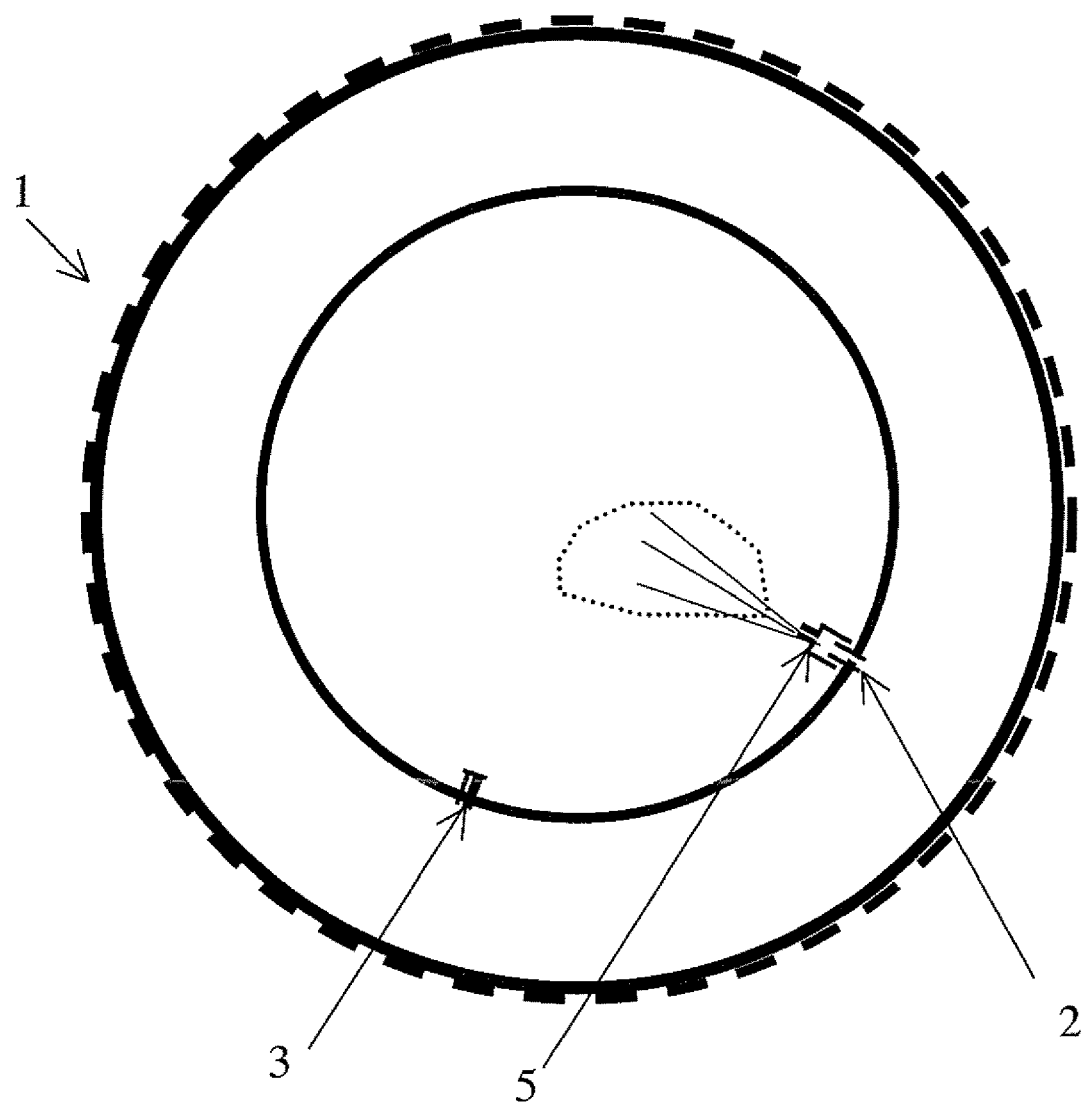
FIG. 1 illustrates equipment for testing a tyre provided with a valve comprising a plug according to an example of an embodiment of the invention.
Figure 1:
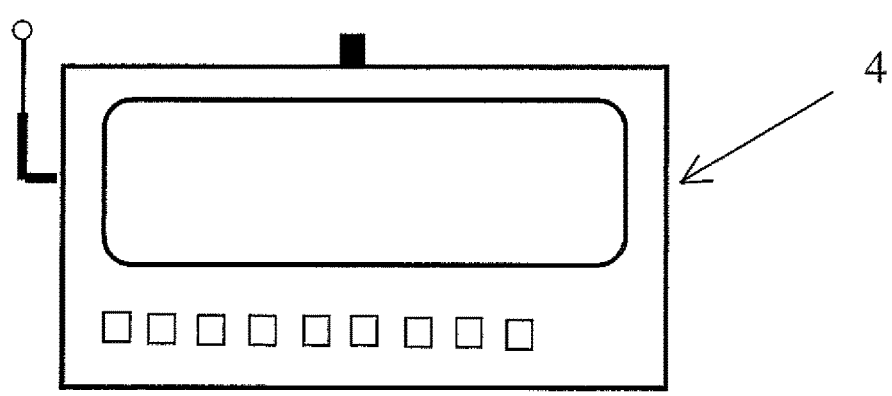

FIG. 1 represents equipment or devices for testing a calibrated leak of gas out of a tyre (or tire) 1 provided with a valve 2 for inflation and intended to be provided in a vehicle (not shown in the drawing). This vehicle can be a car, a van, a truck, a tractor, a trailer, and more generally, any vehicle moving on wheels with pneumatic tyres inflated with a gas. This valve 2 has a cylindrical body extending outside of the tyre, the body being threaded on the outer surface for the screwing on of a protective plug or cap for protection of the valve member. The tyre also has a TPMS sensor 3 typically comprising all or part of the following elements, namely an electronic module comprising an electric battery, a printed circuit card with antennas or communication coils (for reception and transmission), an air-pressure sensor, a temperature sensor, a device for detecting rotation or an accelerometer, a programmable controller and a memory device for memorising or electronically storing data such as the identifier ID of the sensor ID. Such TPMS sensors 3 are designed to regularly wirelessly transmit their information to an electronic control unit (ECU) (not shown in the drawing) that is onboard the vehicle. The ECU analyses the information transmitted from the TPMS sensor 3, and if necessary, detects the presence of a gas leak in a tyre and immediately informs the driver of said leak.

In one example, the equipment or devices for testing a calibrated leak of gas out of a tyre comprises a TPMS tool or measurement device 4 that the operators or users present on a manufacturing line use to receive and process data coming from active TPMS sensors 3. This TPMS tool 4 visible in FIG. 1 is a portable apparatus typically comprising a battery, a processor, a memory storage device, a user interface for the display of information and for the input of commands from the operator, and a radio wave frequency communication means or device. This communication means allows in particular communication with TPMS sensors 3 and optionally long-distance communication with a computer server via a network.

During an exemplary test of the TPMS sensors 3, the operator removes the protective plug of the tyre and replaces it with a test plug 5 that is screwed onto the valve 2. By screwing on the test plug, the latter bears, or applies a pressure force, on the valve member of the valve 2 and triggers its opening allowing flow of pressurized gas from inside the tyre. The gas contained in the tyre escapes through the test plug 5 into a duct, the diameter of which is perfectly calibrated. In doing so, the test plug simulates a leak of gas, the flow rate of which is calibrated. The indications provided by the TPMS sensor 3 that characterise the gas leak seen from inside the tyre are compared to the information provided by this device on the leak detected outside of the tyre. If the indications are almost identical, the TPMS sensor 3 is functioning perfectly.

Other modes and test protocols can be implemented according to the data detected, measured and/or stored from the TPMS sensor 3.

An example of an embodiment of a test plug 5 is now described in relation to the FIGS. 2 through 7 and following.

According to this example of an embodiment, a test plug 5 comprises a head 6 and a test support 7.

Figure 2:
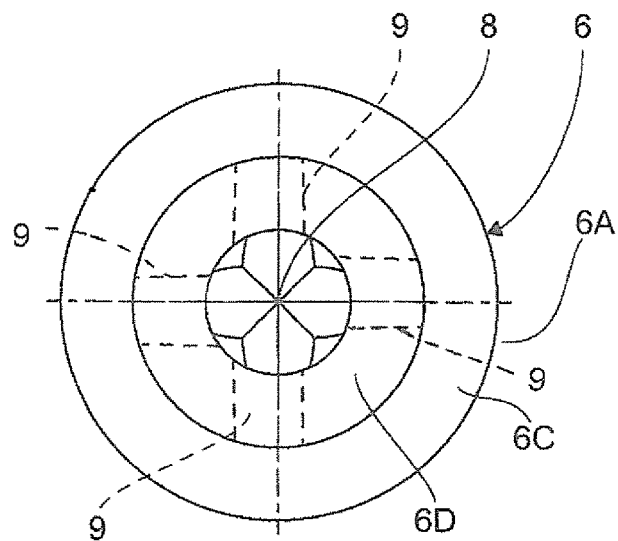
FIG. 2 presents a top view of the head of a test plug according to an example of an embodiment.

FIG. 2 presents a top view of the head 6 of a test plug 5 according to this example of an embodiment. The exemplary head 6 has a cylindrical shape including a first portion 6A having a bottom end 6E and a first outer diameter, a second portion 6B having a second outer diameter smaller than the first diameter and an axial first orifice 8 on the top extending axially downward as further described below. In one example, first portion 6A has an outer diameter of six (6) millimetres (mm), and second portion 6B has an outer diameter of four (4) millimetres (mm). It is understood that larger and smaller diameters may be used.

Figure 3:
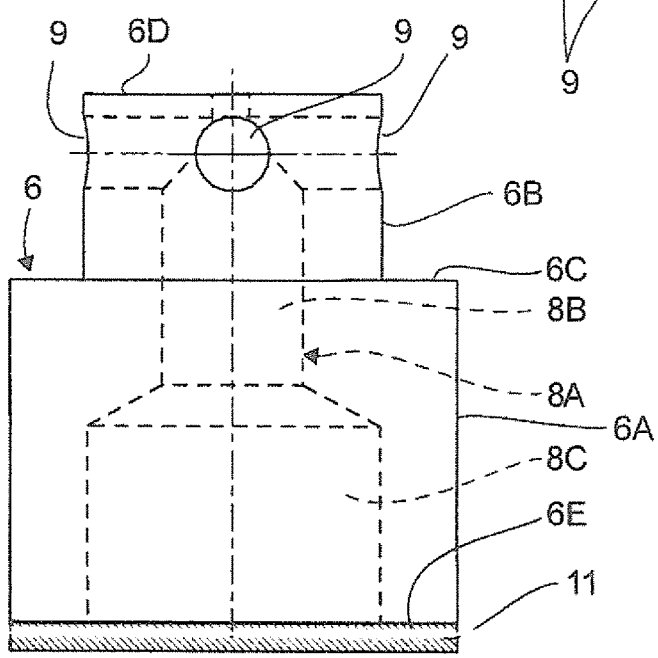
FIG. 3 presents a front elevation view of the head of the test plug according to this example of an embodiment.

FIG. 3 presents a front elevation view of the head 6 of the test plug 5 of the previous FIG. 2. The exemplary head 6 has two portions, a first portion 6A and a second portion 6B, having a different diameter, separated by a shoulder 6C. The surface (visible in FIG. 2) at the end 6D of the second portion 6B having the smaller diameter is intended to come in contact with the valve member of the valve 2 in order to exert a pressure force on the valve member and thus free the gas inside the tyre. When escaping, the gas passes through second orifices 9, total of four shown in FIGS. 2-4. In one example, head 6 includes two orifices 9 positioned 180 degrees apart and are each one (1) millimetre (mm) in diameter. In one example, a center of each orifice 9 is positioned 0.8 millimeters (mm) from the end 6D. It is understood that other numbers, positions and dimensions for orifices 9 can be used.

Figure 4:
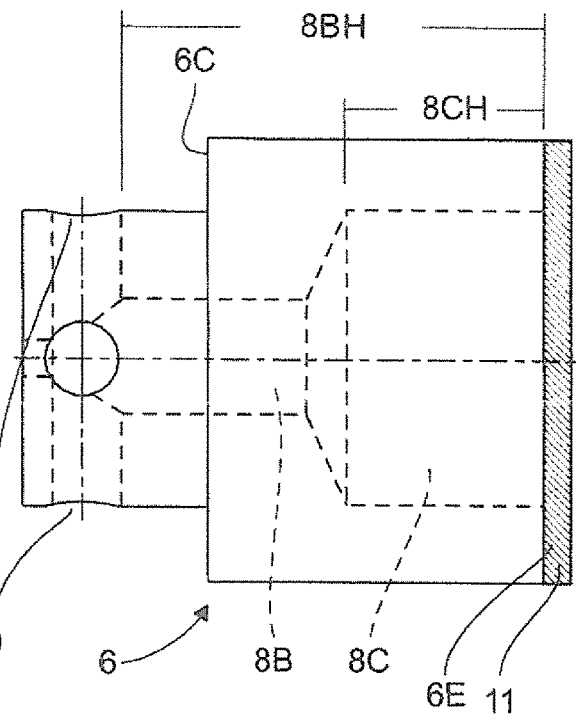
FIG. 4 presents a rotated right side elevation view of the head of the test plug of FIG. 3 according to this same example of an embodiment.

Referring to FIGS. 3 and 4, exemplary head 6 includes an interior chamber 8A for passage of the pressurized air from the tire from the orifices 9 to an element 11 described further below. In the example, interior chamber 8A includes a top portion 8B in fluid communication with orifices 9 and a bottom portion 8C in communication with top portion 8B and open to bottom portion end 6E. In one example, interior chamber top portion 8B is two (2) millimetres (mm) in diameter and bottom portion 8C is four (4) millimetres (mm) in diameter. As best seen in FIG. 4, in one example, bottom portion 8C has a height of 8CH of three (3) millimetres (mm) from bottom 6E and bottom portion 8C and top portion 8B have a total height of 8BH of six (6) millimetres (mm) from bottom 6E as generally shown. It is understood that different sizes, shapes and positions of interior chamber 8A may be used.

Figure 3A:
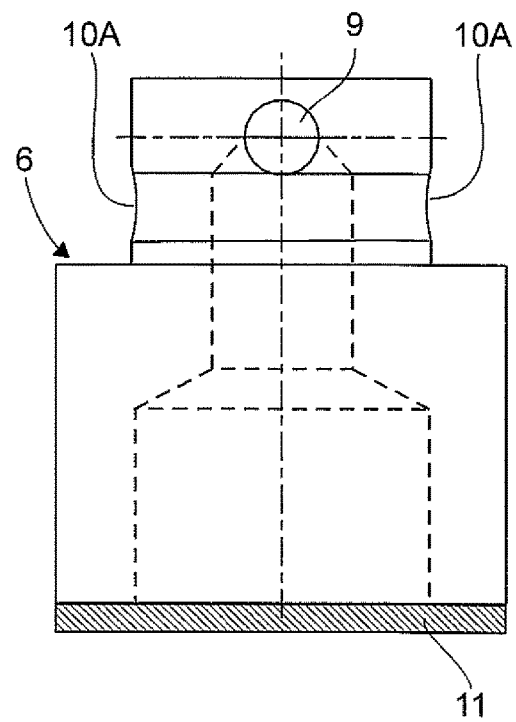
FIG. 3A is a front elevation view of the head of the test plug according to an alternate example of an embodiment.

FIG. 4 presents a rotated view of the head 6 of the test plug 5 shown in the previous FIG. 3. As shown in FIGS. 3 and 4 the presence of an exemplary constriction 10 made all around the portion having the smaller diameter can be seen, this constriction being intended to receive an O-ring (not shown in the drawing) that ensures the sealing between the head 6 and the test support 7. As best seen in FIG. 3A, the constriction 10A is positioned in an alternate position below the orifices 9 and above the shoulder 6C. Other positions of constriction 10 may be used.

In one example, the gas coming from the tyre passes through orifices 9 inside the head 6, into interior chamber 8A and passes through an element 11 having a calibrated cross-section orifice limiting the flow rate of the gas escaping the tyre. This element 11 is for example glued onto the bottom end 6E of the head 6 that is inserted into the bottom of the test support 7 (see FIG. 8). In an alternate example, the pressurized gas also passes through orifice 8 into the interior chamber 8A.

Figure 5:
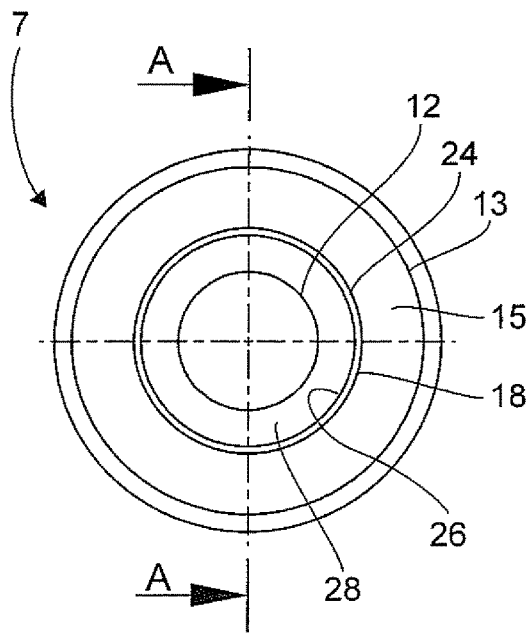
FIG. 5 presents a top view of a support of the test plug according to an example of an embodiment.

FIG. 5 presents a top view of the test support 7 intended to cooperate with the head 6 shown in FIGS. 2, 3, 3A and 4. The exemplary test support 7 also has a cylindrical shape with a bottom orifice 12 on the bottom 16 for the passage of the gas which can thus be evacuated from the test plug 5. The test support 7 is intended to contain the head 6 (see FIG. 8) and to be screwed onto the valve 2.

Figure 6:
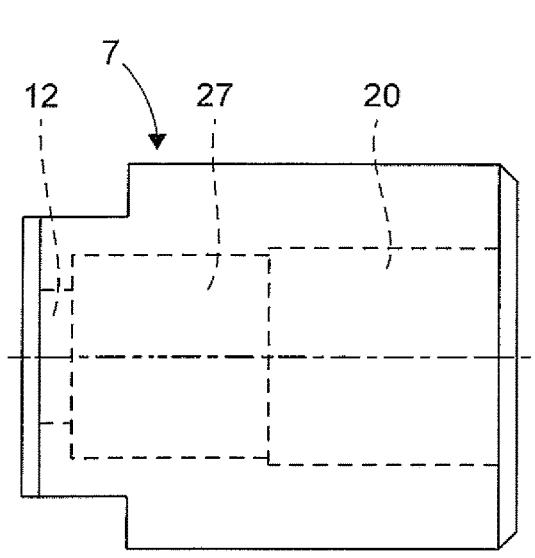
FIG. 6 presents a front elevation view of the test support according to this same example of an embodiment in FIG. 5 rotated clockwise 90 degrees.

FIG. 6 presents a rotated front elevation view of the test support shown in FIG. 5. The presence of a bevel 13 at the base of the test support 7 on the side that is screwed onto the valve 2 can be seen.

Figure 7:
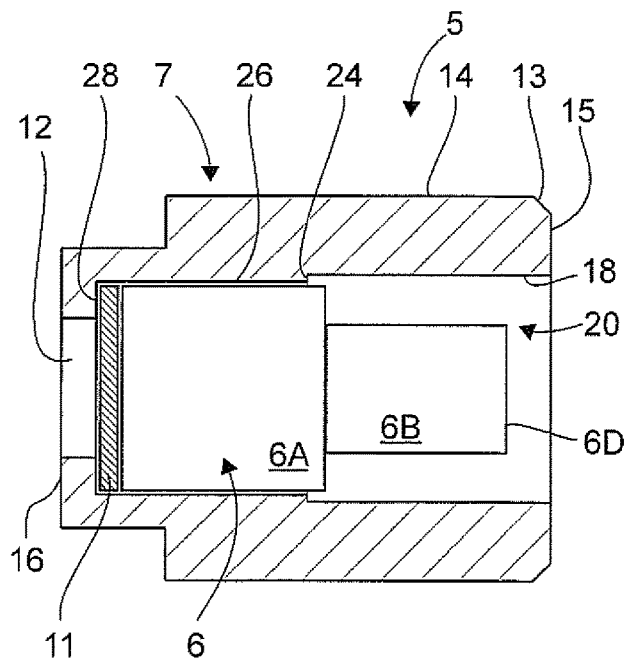
FIG. 7 presents a cross-sectional view taken along line A-A in FIG. 5 in the middle of the test support according to this same example of an embodiment, rotated clockwise 90 degrees, and includes an installed head of the test plug.

FIG. 7 presents a rotated cross-sectional view in the middle of the test support 7 in FIG. 5 according to this same example of an embodiment (showing the head 6 installed). Exemplary test support 7 in FIG. 8 includes a body 14 having a top surface 15, including a first inner wall 18 defining a top orifice 20. Test support 7 further includes a first shoulder 28, a second shoulder 24 and a second inner wall 26 defining a middle orifice 27 in communication with bottom orifice 12 as generally shown. In one example of test plug 5, test support top orifice 20 has a diameter of 6.5 millimeters (mm), middle orifice 27 has a diameter of 6.1 millimeters (mm), and bottom orifice 12 has a diameter of four (4) millimetres (mm). In one example, top orifice has an axial length or depth of seven (7) millimetres (mm) from top surface 15, and middle orifice 27 has an axial length or depth of six (6) millimetres. In one example, bottom orifice 12 has an axial length or depth of three (3) millimetres (mm) from the bottom surface 16. It is understood that larger or smaller diameter orifices, and lengths and positions of the orifices, can be used.

The head 6 in the drawing is placed inside the test support 7 top orifice 20 and middle orifice 27 as generally shown, the head first portion 6A bottom end 6E having the greater diameter and in communication with element 11 limiting the gas flow rate through the head 6 and test plug 5. The end of the test support 7 opposite the element 11 has an inner machine thread (not shown) on first inner wall 18 in order to be screwed onto the valve 2. When screwing on, the second portion 6B having the smaller diameter of the head 6 forcibly axially presses on the valve member of the valve 2 in order to let the pressurized gas of the tyre escape and through the test plug 5 as described.

According to the flow rate that is desired to be caused, the exemplary element 11 having a calibrated cross-section orifice limiting the flow rate is, for example, a sintered element or a disc pierced by a hole, the sintered element having a greater thickness than the disc.

The method for using the equipment or devices for testing a calibrated leak of gas out of a tyre 1, by using a test plug 5 that is screwed onto the valve 2 of this tyre 1 in order to let a certain flow rate of gas escape, will now be described.

In one example, first, the TPMS tool 4 enters into electronic, wireless communication with a TPMS sensor 3 installed on a tyre 1. The operator removes the protective plug of this tyre and places the test plug 5 on the valve 2. According to an example of an improvement, the test plug 5 includes a removable seal (not shown) intended to be removed before the installation of the plug 5 on the tyre. In this way, dust does not enter the test plug 5 and the element 11 limiting the flow rate remains clean.

Advantageously in one example, the equipment comprises a set of a plurality of individual test plugs 5 for producing various calibrated-leak flow rates, for example: 0.1 cm3/mn, 1.1 cm3/mn and 0.5 cm3/mn. These values are typical of slow leaks in a tyre. Other values can be recommended by the manufacturer for a certain pressure in the tyre.

During the screwing or threaded engagement onto the valve 2, the test plug 5 bears on the valve member and the pressurized gas escapes from the tyre according to a flow rate determined by the element 11 limiting the flow rate. The TPMS tool 4 regularly receives the measurements coming from the TPMS sensor 3 and calculates the speed of decrease in the tyre internal gas pressure. The TPMS tool 4 then displays a value representative of the decrease in the gas pressure measured during a predetermined time interval. In this way, the operator verifies that the TPMS sensor 3 is functioning correctly. Once the test has been carried out, the test plug 5 is removed and replaced with the protective plug. When the test plug 5 comprises an element 11 limiting flow rate subject to wear, it is designed either to be regularly tested in order to be recalibrated or to be simply thrown away after a certain number of uses.

Advantageously in one example, the TPMS tool 4 includes adjustable detection and measurement means, through a device and process, adapted to each of said test plugs 5. In this way, the TPMS tool 4 can verify that the decrease in tire gas pressure measured by the TPMS sensor 3 indeed corresponds to the flow rate of the gas leak caused by the installation of the particular test plug 5 on the tyre 1. In one example, the TPMS tool 4 has a memory storage device for the storage and restitution or recall from the memory storage device of the test results on tyres. In one example, the TPMS tool 4 memorises or stores in the memory storage device the conditions of the test, and in particular the calibration of the test plug 5 used, and has means, through a device and process, for exporting or transferring these results to other devices, for example a computer and printer, in order to print them or display them on a screen.

Advantageously in one example, the TPMS tool 4 emits a sound and/or light signal when the tyre gas pressure measured decreases and falls below a predetermined threshold. In this way, the operator can be alerted that the TPMS sensor 3 did indeed emit pressure values that decrease and that the test can be considered to be conclusive.

Advantageously in one example, the TPMS tool 4 is an instrument that may be calibrated and verified, in line with international norms. It allows the verification of the calibration of the instruments for measurement of a leak and of flow rate and of the leaks and of the jets calibrated. It is preferably light, compact and user friendly for tests in the field or in a manufacturing line.

According to another example of an improvement, the TPMS tool 4 includes a means, through a device and process, for introducing a piece of information or data representative of the internal volume of the tyre 1. By knowing the internal volume and by taking into account the decrease in internal gas pressure caused by the installation of the test plug 5, the TPMS tool 4 can calculate and display the gas flow rate of the leak according to the change in the decrease in pressure and the volume of the tyre. The operator can then correlate this value with the gas flow rate that a particular test plug 5 should generate and thus verify that the two values are identical.

Although the present invention was described in reference to the specific embodiments illustrated, said invention is in no way limited by these embodiments, but is only limited by the appended claims. In particular, the present invention can be used by any type of vehicle provided with wheels inflated by a gas. It is noted that changes or modifications can be made by a person skilled in the art.

What is claimed is:

1. Equipment for use in testing a calibrated leak of pressurized gas out of a tire comprising:
   a test plug operable to be removably and directly connected to a valve of a tire, the test plug comprising:
     a device operable to apply a pressure force on a valve member of the tire valve through engaging of the test plug to the valve operable to open the valve allowing pressurized gas to leak out of said tire through the tire valve; and
     an orifice having a fixed calibrated cross-section including a predetermined gas flow rate wherein on connection of the test plug to the tire valve and the opening of the tire valve, the pressurized gas from the tire passes through the orifice calibrated cross-section at the predetermined flow rate generating a calibrated leak of a volume of the pressurized gas from the tire for a predetermined time period;

a detection device operable to regularly measure and communicate a pressure of the pressurized gas in the tire during the predetermined time period that the pressurized gas from the tire is passing through the test plug orifice calibrated cross-section; and a tool in communication with the detection device operable to receive the pressure measurements from the detection device during the predetermined time period and provide an indication whether the detection device is detecting the calibrated leak of the pressurized gas from the tire.

2. The equipment according to claim 1, wherein the detection device comprises a tire pressure management system (TPMS) sensor mounted in said tire in communication with the pressurized gas.

3. The equipment according to claim 2, wherein the TPMS sensor further comprises a device operable to communicate by radio frequency with the tool.

4. The equipment according to claim 2, wherein the test plug comprises a set of a plurality of test plugs each of the plurality of test plugs having a different fixed calibrated cross-section and predetermined gas flow rate of pressurized gas; and the tool further comprises selectable measurement means adapted to each of said plurality of test plugs.

5. The equipment according to claim 2, wherein the tool comprises a portable TPMS tool including a processor, memory storage device, and a user interface, the TPMS tool operable to calculate a change in value of the measured pressures of the tire received from the TPMS sensor over the predetermined time period and provide an indication whether the TPMS sensor is accurately measuring the pressure of the pressurized gas as a result of the calibrated leak of the pressurized gas from the tire.

6. The equipment according to claim 5, wherein the TPMS tool is operable to display on the user interface the calculated change in value of the measured pressures.

7. The equipment according to claim 5, wherein the TPMS tool calculates a gas flow rate based on the calculated change in value of the measured pressures over the predetermined time period and a predetermined internal volume of the tire.

8. The equipment according to claim 7, wherein the TPMS tool is operable to display the calculated gas flow rate on the TPMS tool user interface, the displayed calculated gas flow rate is compared to the test plug predetermined gas flow rate to determine whether the TPMS sensor is accurately measuring the pressure of the pressurized gas as a result of the calibrated leak of the pressurized gas from the interior of the tire.

9. The equipment according to claim 8, wherein the test plug comprises a plurality of test plugs each having a predetermined gas flow rate, the predetermined gas flow rates for the plurality of test plugs are stored in the TPMS tool memory storage device.

10. The equipment according to claim 9, wherein the stored predetermined gas flow rates comprise at least one of 0.1 cm3/minute, 1.1 cm3/minute, or 0.5 cm3/minute.

11. The equipment according to claim 5, wherein the portable TPMS tool is physically separate and physically disconnected from the test plug.

12. The equipment according to claim 5, wherein the portable TPMS tool is physically separate and physically disconnected from the TPMS sensor.

13. The equipment of claim 1, wherein the test plug is a disposable element operable to be thrown away after a predetermined number of uses.

14. A method for testing a calibrated leak of pressurized gas from an interior of a tire, the method comprising the steps of:

engaging a test plug directly to a tire valve, the test plug having a fixed calibrated cross-section orifice defining a predetermined calibrated gas flow rate through the test plug;

through the engaging of the test plug with the tire valve applying a pressure force to a tire valve member by the test plug to release a pressurized gas from an interior of a tire through the tire valve, the pressure force applied during the engaging of the test plug to the tire valve;

releasing a calibrated leak of a volume of the pressurized gas from the interior of the tire through the engaged test plug calibrated cross-section orifice at the predetermined calibrated gas flow rate for a predetermined time period;

regularly measuring through a detection device a pressure of the pressurized gas in the interior of the tire during the predetermined time period that the pressurized gas is passing through the test plug calibrated cross-section orifice;

communicating the measured pressures of the pressurized gas by the detection device to a tool; and determining by the tool whether the detection device is detecting the calibrated leak of the pressurized gas from the interior of the tire.

15. The method of claim 14, wherein the detection device comprises a tire pressure management system (TPMS) sensor positioned in the interior of the tire in communication with the pressurized gas and the tool comprises a portable TPMS tool, the method further comprising:

calculating in the TPMS tool a change in value of the measured pressures in the interior of the tire during the predetermined time period; and determining by the TPMS tool whether the TPMS sensor is accurately measuring the pressure of the pressurized gas as a result of the calibrated leak of the pressurized gas from the interior of the tire.

16. The method according to claim 15 further comprising the step of:

calculating in the TPMS tool a gas flow rate based on the calculated change in value of the measured pressures over the predetermined time period and a predetermined internal volume of the tire.

17. The method according to claim 16 further comprising the step of displaying on a user interface of the TPMS tool the calculated gas flow rate.

18. The method according to claim 17 further comprising the step of comparing the displayed calculated gas flow rate to the test plug predetermined calibrated gas flow rate.

19. The method according to claim 18 further comprising the step of displaying the test plug predetermined calibrated gas flow rate on the user interface of the TPMS tool.

20. The method according to claim 19 further comprising the step of storing in a TPMS tool memory storage device the test plug predetermined calibrated gas flow rate for a plurality of test plugs each having different test plug predetermined calibrated gas flow rates.

* * * * *